(12) United States Patent
Ackerman et al.

(10) Patent No.: US 11,752,708 B2
(45) Date of Patent: Sep. 12, 2023

(54) UNCURED COMPOSITE STRUCTURES, CURED COMPOSITE STRUCTURES, AND METHODS OF CURING UNCURED COMPOSITE STRUCTURES

(71) Applicant: The Boeing Company, Chicago, IL (US)

(72) Inventors: Patrice K. Ackerman, Kent, WA (US); Gwen Marie Lanphere Gross, Redmond, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/471,553

(22) Filed: Sep. 10, 2021

(65) Prior Publication Data

US 2023/0080641 A1 Mar. 16, 2023

(51) Int. Cl.
*B29C 70/46* (2006.01)
*B29C 70/34* (2006.01)
(Continued)

(52) U.S. Cl.
CPC .......... *B29C 70/34* (2013.01); *B29K 2307/04* (2013.01)

(58) Field of Classification Search
CPC . B29C 70/003; B29C 70/0035; B29C 70/026; B29C 37/0025; B29C 71/02
See application file for complete search history.

(56) References Cited

U.S. PATENT DOCUMENTS

| | | | | |
|---|---|---|---|---|
| 2,744,044 A | * | 5/1956 | Toulmin, Jr. | B32B 27/00 181/290 |
| 2,956,613 A | * | 10/1960 | Edelman | H01B 3/40 427/386 |

(Continued)

FOREIGN PATENT DOCUMENTS

| | | |
|---|---|---|
| CN | 104837605 | 8/2015 |
| CN | 105936131 | 9/2016 |

(Continued)

OTHER PUBLICATIONS

Machine-generated English language translation of the abstract of CN 104837605, downloaded from Esapcenet.com on Apr. 2, 2021.

(Continued)

*Primary Examiner* — Matthew J Daniels
(74) *Attorney, Agent, or Firm* — Kolitch Romano Dascenzo Gates LLC (57) ABSTRACT

Uncured composite structures, cured composite structures, and methods of curing uncured composite structures are disclosed herein. The uncured composite structures include a structural layer that includes an uncured structural resin and a surface layer that includes an uncured surface resin. The cured composite structures include a cured structural layer that includes a cured structural resin, a cured surface layer that includes a cured surface resin, and an interface region between the cured surface layer and the cured structural layer. The methods include initially heating the uncured composite structure to an initial temperature to generate a partially cured composite structure. The initially heating is sufficient to gel the uncured surface resin but insufficient to gel the uncured structural resin. The methods also include subsequently heating the partially cured composite structure to a final cure temperature, which is greater than the initial temperature, to generate the cured composite structure.

16 Claims, 3 Drawing Sheets

(51) Int. Cl.
*B29C 35/02* (2006.01)
*B29K 307/04* (2006.01)

(56) References Cited

U.S. PATENT DOCUMENTS

| | | | | |
|---|---|---|---|---|
| 3,085,921 | A * | 4/1963 | Zeise, Jr. | B29C 70/003 428/501 |
| 3,318,760 | A * | 5/1967 | Hermann, V | C08J 7/0427 428/530 |
| 3,567,543 | A * | 3/1971 | Standage | B29C 70/12 156/181 |
| 3,707,434 | A * | 12/1972 | Stayner | E04C 2/205 428/313.5 |
| 3,718,721 | A | 2/1973 | Gould et al. | |
| 3,968,309 | A * | 7/1976 | Matsuo | C08J 7/043 522/182 |
| 4,025,686 | A * | 5/1977 | Zion | B32B 38/08 428/313.5 |
| 4,551,290 | A * | 11/1985 | Mizell | B29C 70/302 264/269 |
| 4,800,123 | A * | 1/1989 | Boeckeler | C08J 5/00 428/424.2 |
| 4,808,361 | A * | 2/1989 | Castro | B29C 37/0028 264/DIG. 59 |
| 5,164,127 | A * | 11/1992 | Boeckeler | C08J 5/00 264/447 |
| 5,207,956 | A | 5/1993 | Kline et al. | |
| 5,453,226 | A | 9/1995 | Kline et al. | |
| 5,914,385 | A * | 6/1999 | Hayashi | C09D 179/08 528/229 |
| 6,490,501 | B1 | 12/2002 | Saunders | |
| 6,602,552 | B1 * | 8/2003 | Daraskevich | C08G 18/222 427/388.1 |
| 8,834,668 | B2 | 9/2014 | Nelson et al. | |
| 9,051,062 | B1 | 6/2015 | Boone et al. | |
| 9,302,455 | B1 | 4/2016 | Boone et al. | |
| 9,322,189 | B2 * | 4/2016 | Beale | C09D 167/06 |
| 2003/0148109 | A1 * | 8/2003 | Timberlake | C08G 59/3254 428/417 |
| 2003/0157309 | A1 * | 8/2003 | Ellis | B32B 3/266 428/292.1 |
| 2004/0091622 | A1 * | 5/2004 | Fernandes | B32B 27/04 427/420 |
| 2004/0092697 | A1 * | 5/2004 | Kia | C08G 18/3271 528/65 |
| 2007/0001343 | A1 * | 1/2007 | Pulman | C08G 18/755 264/255 |
| 2010/0298979 | A1 | 11/2010 | Christopher et al. | |
| 2012/0283348 | A1 | 11/2012 | Akita et al. | |
| 2014/0072775 | A1 | 3/2014 | De Mattia | |
| 2014/0144568 | A1 | 5/2014 | MacAdams et al. | |
| 2014/0216635 | A1 | 8/2014 | Zahlen et al. | |
| 2014/0302446 | A1 | 10/2014 | Anderson et al. | |
| 2014/0318693 | A1 | 10/2014 | Nelson et al. | |
| 2015/0031818 | A1 * | 1/2015 | Moser | B29C 70/54 264/258 |
| 2015/0056433 | A1 | 2/2015 | MacAdams et al. | |
| 2016/0214328 | A1 | 7/2016 | MacAdams et al. | |
| 2016/0257427 | A1 | 9/2016 | Humfeld et al. | |
| 2016/0318214 | A1 | 11/2016 | Martinez et al. | |
| 2020/0009765 | A1 | 1/2020 | Dalal et al. | |
| 2020/0055261 | A1 | 2/2020 | Nelson et al. | |
| 2021/0206126 | A1 | 7/2021 | Shimizu et al. | |

FOREIGN PATENT DOCUMENTS

| | | |
|---|---|---|
| EP | 1151850 | 11/2001 |
| EP | 1547753 | 6/2005 |
| EP | 2055464 | 5/2009 |
| EP | 3088152 | 11/2016 |
| EP | 3208078 A1 | 8/2017 |
| FR | 2675711 | 10/1992 |
| JP | 2018202804 A | 12/2018 |
| KR | 2016-0045776 | 10/2016 |
| WO | WO 2012/002340 | 1/2012 |
| WO | WO 2014/081652 | 5/2014 |
| WO | WO 2015/026441 A1 | 2/2015 |

OTHER PUBLICATIONS

Machine-generated English language translation of the abstract of CN 105936131, downloaded from Esapcenet.com on Apr. 2, 2021.
Machine-generated English translation of the abstract of FR 2675711, downloaded from Espacenet.com Aug. 6, 2019.
Machine-generated English translation of the abstract of WO 2012/002340, downloaded from Espacenet.com Aug. 6, 2019.
European Patent Office, Extended European Search Report for related European Application No. 22187325, dated Jan. 19, 2023.
Machine-generated English language translation of Japan Patent Application Pubiicaiion No. 2018202804A, dated Dec. 27, 2018.

* cited by examiner

UNCURED COMPOSITE STRUCTURES, CURED COMPOSITE STRUCTURES, AND METHODS OF CURING UNCURED COMPOSITE STRUCTURES

FIELD

The present disclosure relates generally uncured composite structures, to cured composite structures, and/or to methods of curing uncured composite structures.

BACKGROUND

Composite structures generally include a fiber and a resin material. Chemical and/or physical properties of the fiber and/or of the resin material may have a significant impact on the chemical and/or physical properties of the composite structure that is formed therefrom. As examples, the structural integrity, longevity, chemical resistivity, and/or light stability of the composite structure may be dictated by the chemical and/or physical properties of the fiber and/or of the resin material. With this in mind, a specific fiber and/or resin may be utilized to form a specific composite structure with one or more desired physical and/or chemical properties. In some examples, a composite structure that exhibits one or more desired physical and/or chemical properties also may exhibit one or more undesired physical and/or chemical properties. As a specific example, a composite structure that exhibits a desired structural integrity also may exhibit an undesired chemical resistivity and/or light stability.

It is known to coat and/or cover a composite structure, such as to protect the composite structure from environmental factors. In some examples, such coating may be accomplished by painting the composite structure. In other examples, it may be desirable to form a hybrid composite structure that includes a surface composite layer and an underlying composite layer. The surface composite layer may be selected to protect the underlying composite layer from the environmental factors, while the underlying composite structure may be selected to provide a desired structural integrity. However, it is difficult to maintain a desired level of distinction between the surface composite layer and the underlying composite layer during curing of the hybrid composite structure. Thus, there exists a need for improved uncured composite structures, cured composite structures, and/or methods of curing uncured composite structures.

SUMMARY

Uncured composite structures, cured composite structures, and methods of curing uncured composite structures are disclosed herein. The uncured composite structures include a structural layer that includes an uncured structural resin and a surface layer that includes an uncured surface resin. The uncured structural resin is an uncured structural resin with a structural resin viscosity, a structural resin gel point temperature, and a structural resin gel time. The uncured surface resin has a surface resin viscosity that is greater than the structural resin viscosity, a surface resin gel point temperature that is less than the structural resin gel point temperature, and a surface resin gel time that is less than the structural resin gel time.

The cured composite structures include a cured structural layer that includes a cured structural resin formed from the uncured structural resin, a cured surface layer that includes a cured surface resin formed from the uncured surface resin and includes an exposed surface, and an interface region between the cured surface layer and the cured structural layer. The exposed surface is free of the cured structural resin and the interface region includes a mixture of the cured surface resin and the cured structural resin.

The methods include initially heating an uncured composite structure to an initial temperature to generate a partially cured composite structure. The initially heating is sufficient to gel the uncured surface resin but insufficient to gel the uncured structural resin. The methods also include subsequently heating the partially cured composite structure to a final cure temperature, which is greater than the initial temperature, to generate the cured composite structure. A combination of the initially heating and the subsequently heating is sufficient to fully cure both the uncured surface resin and the uncured structural resin.

DESCRIPTION

FIGS. 1-4 provide illustrative, non-exclusive examples of uncured composite structures 12, cured composite structures 14, and/or methods 100, according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any of FIGS. 1-4 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 1:
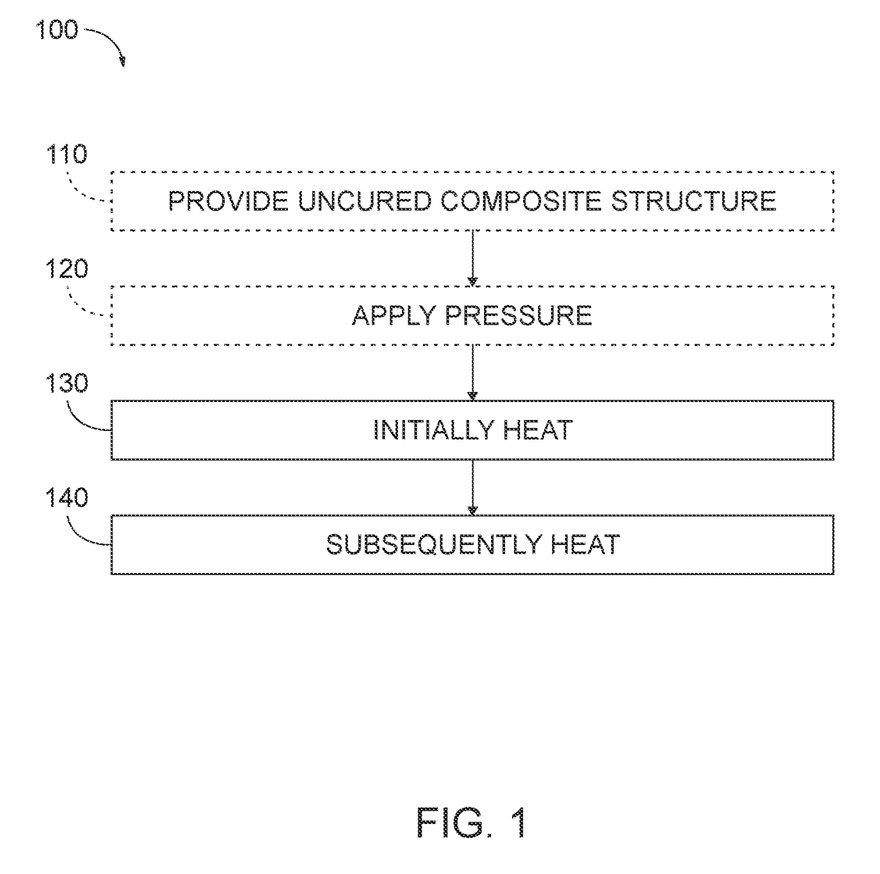
FIG. 1 is a flowchart illustrating examples of methods of curing an uncured composite structure, according to the present disclosure.
Figure 2:
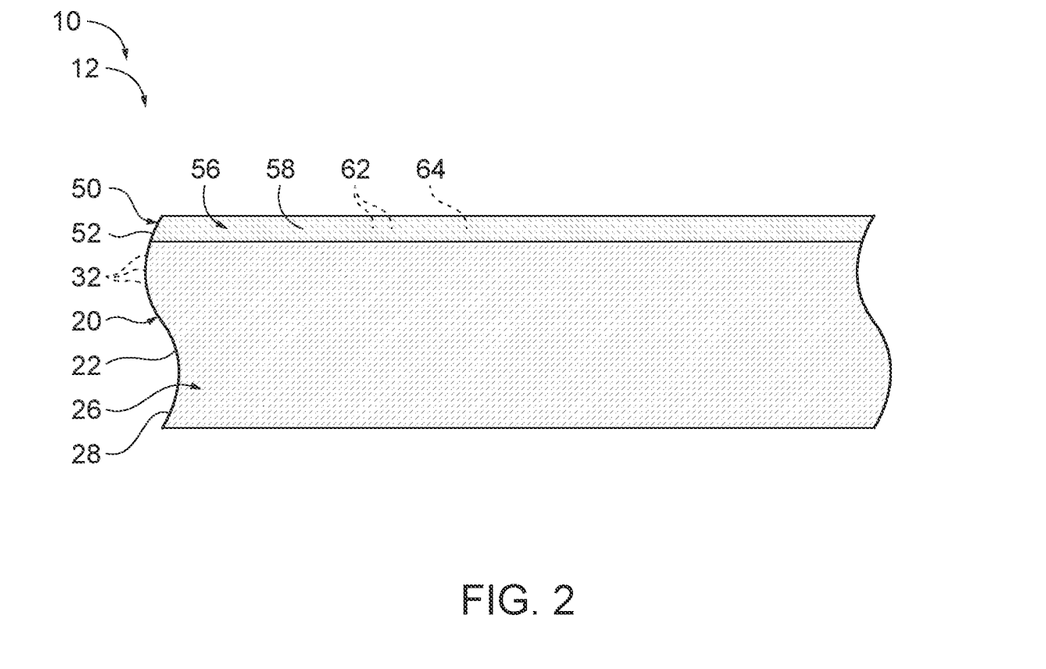
FIG. 2 is a schematic cross-sectional view illustrating examples of an uncured composite structure according to the present disclosure.

FIG. 1 is a flowchart illustrating examples of methods 100 of curing an uncured composite structure, according to the present disclosure. The uncured composite structure includes a structural layer, which includes an uncured structural resin, and a surface layer, which includes an uncured surface resin. An example of the uncured composite structure is illustrated in FIG. 2. More specifically, FIG. 2 illustrates a composite structure 10 in the form of an uncured composite structure 12. Uncured composite structure 12 includes a structural layer 20, in the form of an uncured structural layer 22, that includes a structural resin 26, in the form of an uncured structural resin 28. Uncured composite structure 12 also includes a surface layer 50, in the form of an uncured surface layer 52, that includes a surface resin 56, in the form of an uncured surface resin 58.

Methods 100 may include providing an uncured composite structure at 110 and/or applying a pressure at 120. Methods 100 include initially heating at 130 and subsequently heating at 140.

Providing the uncured composite structure at 110 may include providing any suitable uncured composite structure, which includes the structural layer and the surface layer, in any suitable manner. As an example, the providing at 110 may include laying up, forming, and/or defining the uncured composite structure. In some examples, and as discussed in more detail herein, the providing at 110 includes providing such that the structural resin has a structural resin viscosity, a structural resin gel point temperature, and a structural resin gel time. In some examples, and as also discussed in more detail herein, the providing at 110 includes providing such that the surface resin has a surface resin viscosity, a surface resin gel point temperature, and a surface resin gel time. In some examples, the structural resin viscosity is less than the surface resin viscosity, the surface resin viscosity is greater than the structural resin viscosity, the structural resin gel point temperature is greater than the surface resin gel point temperature, the surface resin gel point temperature is less than the structural resin gel point temperature, the structural resin gel time is greater than the surface resin gel time, and/or the surface resin gel time is less than the structural resin gel time.

Applying the pressure at 120 may include applying the pressure to the uncured composite structure during the initially heating at 130 and/or applying the pressure to the partially cured composite structure during the subsequently heating at 140. In some examples, the applying the pressure at 120 includes applying an elevated atmospheric pressure to the uncured composite structure and/or to the partially cured composite structure. In some examples, the applying at 120 includes utilizing an autoclave, autoclaving the uncured composite structure during the initially heating at 130, and/or autoclaving the partially cured composite structure during the subsequently heating at 140.

In some examples of methods 100, the initially heating at 130 includes hardening the surface layer to generate a hardened surface layer. In some such examples, methods 100 further include resisting deformation of the hardened surface layer, which may be caused by the applying at 120, during the subsequently heating at 140. Stated another way, the initially heating at 130 may harden the surface layer such that, during the subsequently heating at 140, the hardened surface layer is more resistant to deformation when compared to the structural layer and/or to the uncured surface layer. Such a configuration may permit the hardened surface layer to function as and/or to be a resin shell for the structural layer during the subsequently heating at 140. Such a configuration may cause composite structures, which are formed utilizing methods 100, to have an improved surface quality and/or to have fewer defects when compared to conventional composite structures that do not include the surface layer and the structural layer disclosed herein.

Initially heating at 130 may include initially heating the uncured composite structure to an initial temperature, such as to produce and/or generate the partially cured composite structure. As discussed, the uncured surface resin has the surface resin viscosity, the surface resin gel point temperature, and the surface resin gel time. The initially heating at 130 is sufficient to gel the uncured surface resin, such as to generate a cured surface resin, but is insufficient to gel the uncured structural resin. Stated another way, and subsequent to the initially heating at 130, the surface resin may be cured, gelled, and/or hardened; however, the structural resin may be uncured, ungelled, and/or unhardened.

In some examples, the initially heating at 130 includes initially heating for an initial heating time. In some such examples, the initial heating time includes and/or is a dwell time during which the uncured composite structure is maintained at the initial temperature. Stated another way, the initially heating at 130 may include dwelling at the initial temperature for the initial heating time. In such examples, the initial heating time also may be referred to herein as an initial dwell time at the initial temperature.

In some examples, the initial heating time includes and/or is a ramp time during which the uncured composite structure is ramped to the initial temperature. Stated another way, the initially heating at 130 may include ramping the uncured composite structure to the initial temperature during the initial heating time. In some such examples, the initial heating time also may be referred to herein as an initial ramp time to the initial temperature.

The initial temperature may have any suitable magnitude and/or value, such as may be selected based, at least in part, on one or more desired properties of the surface layer, the surface resin viscosity, the surface resin gel point temperature, and/or the surface resin gel time. Examples of the initial temperature include initial temperatures of at least 60 degrees Celsius (° C.), at least 65° C., at least 70° C., at least 75° C., at least 80° C., at least 85° C., at least 90° C., at least 95° C., at least 100° C., at least 105° C., at least 110° C., at most 150° C., at most 145° C., at most 140° C., at most 135° C., at most 130° C., at most 125° C., at most 120° C., at most 115° C., at most 110° C., at most 105° C., at most 100° C., at most 95° C., at most 90° C., at most 85° C., and/or at most 80° C. Stated differently, the initial temperature may be bounded by any of the above temperatures, as appropriate.

Similarly, the initial heating time may have any suitable magnitude and/or value, such as may be selected based, at least in part, on one or more desired properties of the surface layer, the surface resin viscosity, the surface resin gel point temperature, and/or the surface resin gel time. Examples of the initial heating time include initial heating times of at least 2 minutes, at least 4 minutes, at least 6 minutes, at least 8 minutes, at least 10 minutes, at least 12 minutes, at least 14 minutes, at least 16 minutes, at least 18 minutes, at least 20 minutes, at most 120 minutes, at most 110 minutes, at most 100 minutes, at most 90 minutes, at most 80 minutes, at most 70 minutes, at most 60 minutes, at most 50 minutes, at most 40 minutes, at most 38 minutes, at most 36 minutes, at most 34 minutes, at most 32 minutes, at most 30 minutes, at most 28 minutes, at most 26 minutes, at most 24 minutes, at most 22 minutes, at most 20 minutes, at most 18 minutes, at most 16 minutes, at most 14 minutes, at most 12 minutes, and/or at most 10 minutes. Stated differently, the initial heating time may be bounded by any of the above times, as appropriate.

Subsequently heating at 140 may include subsequently heating the partially cured composite structure to a final cure temperature, which is greater than the initial temperature, to produce and/or generate a cured composite structure. The subsequently heating at 140 may be performed subsequent to, or after, the initially heating at 130. As discussed, the uncured structural resin has a structural resin viscosity, which is less than the surface resin viscosity, a structural resin gel point temperature, which is greater than the surface resin gel point temperature, and a structural resin gel time, which is greater than the surface resin gel time. Subsequent to the subsequently heating at 140, the uncured surface resin and the uncured structural resin are fully cured. Stated another way, a combination of the initially heating at 130 and the subsequently heating at 140 is sufficient to fully cure both the uncured surface resin and the uncured structural resin, such as to produce and/or generate the cured surface resin an a cured structural resin, respectively.

Figure 3:
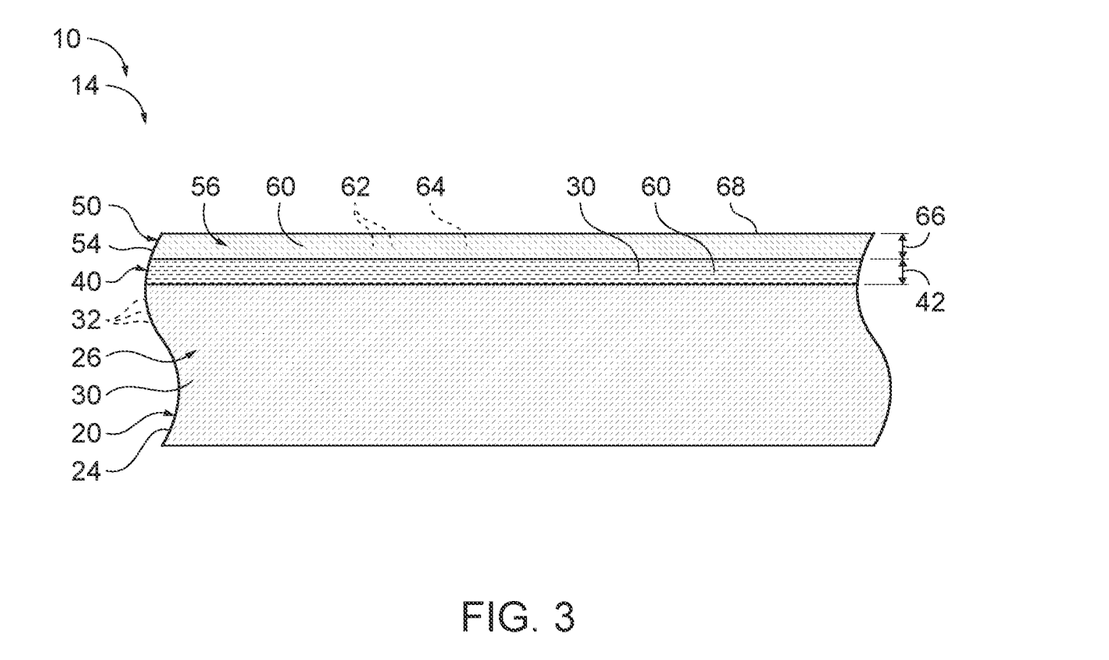
FIG. 3 is a schematic cross-sectional view illustrating examples of a cured composite structure according to the present disclosure.

An example of the cured composite structure is illustrated in FIG. 3. More specifically, FIG. 3 illustrates a composite structure 10 in the form of a cured composite structure 14. Cured composite structure 14 may be formed from uncured composite structure 12 of FIG. 2, such as by performing methods 100. Cured composite structure 14 includes structural layer 20, in the form of a cured structural layer 24, that includes structural resin 26, in the form of cured structural resin 30. Cured composite structure 14 also includes surface layer 50, in the form of a cured surface layer 54, that includes surface resin 56, in the form of cured surface resin 60.

In some examples, the subsequently heating at 140 includes subsequently heating for a subsequent heating time. In some such examples, the subsequent heating time includes and/or is a dwell time during which the partially cured composite structure is maintained at the final cure temperature. Stated another way, the subsequently heating at 140 may include dwelling at the final cure temperature for the subsequent heating time. In such examples, the subsequent heating time also may be referred to herein as a subsequent dwell time at the final cure temperature.

In some examples, the subsequent heating time includes and/or is a ramp time during which the uncured composite structure is ramped from the initial temperature and/or to the final cure temperature. Stated another way, the subsequently heating at 140 may include ramping the partially cured composite structure to the final cure temperature during the subsequent heating time. In some such examples, the subsequent heating time also may be referred to herein as a subsequent ramp time to the final cure temperature.

The final cure temperature may have any suitable magnitude and/or value, such as may be selected based, at least in part, on one or more desired properties of the structural layer, the structural resin viscosity, the structural resin gel point temperature, and/or the structural resin gel time. Examples of the final cure temperature include final cure temperatures of at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., at least 185° C., at least 190° C., at least 195° C., at least 200° C., at most 260° C., at most 250° C., at most 240° C., at most 230° C., at most 220° C., at most 210° C., at most 200° C., at most 195° C., at most 190° C., at most 185° C., at most 180° C., at most 175° C., at most 170° C., at most 165° C., at most 160° C., at most 155° C., at most 150° C., at most 145° C., at most 140° C., at most 135° C., and/or at most 130° C. Stated differently, the final cure temperature may be bounded by any of the above temperatures, as appropriate.

In some examples, the final cure temperature differs from, or is greater than, the initial temperature by a threshold temperature difference. As examples, the difference between the final cure temperature and the initial temperature may be at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at most 120° C., at most 110° C., at most 100° C., at most 90° C., at most 80° C., at most 70° C., at most 60° C., and/or at most 50° C. Stated differently, the threshold temperature difference may be bounded by any of the above temperature differences, as appropriate.

Similarly, the subsequent heating time may have any suitable magnitude and/or value, such as may be selected based, at least in part, on one or more desired properties of the structural layer, the structural resin viscosity, the structural resin gel point temperature, and/or the structural resin gel time. Examples of the subsequent heating time include subsequent heating times of at least 15 minutes, at least 20 minutes, at least 25 minutes, at least 30 minutes, at least 35 minutes, at least 40 minutes, at least 45 minutes, at least 50 minutes, at least 55 minutes, at least 60 minutes, at most 150 minutes, at most 140 minutes, at most 130 minutes, at most 120 minutes, at most 115 minutes, at most 110 minutes, at most 105 minutes, at most 100 minutes, at most 95 minutes, at most 90 minutes, at most 85 minutes, at most 80 minutes, at most 75 minutes, at most 70 minutes, at most 65 minutes, and/or at most 60 minutes. Stated differently, the subsequent heating time may be bounded by any of the above heating times, as appropriate.

In some examples, the subsequent heating time differs from, or is greater than, the initial heating time by a threshold time difference. Examples of the difference between the subsequent heating time and the initial heating time include times of at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 60 minutes, at least 70 minutes, at least 80 minutes, at least 90 minutes, at least 100 minutes, at least 110 minutes, at least 120 minutes, at most 150 minutes, at most 140 minutes, at most 130 minutes, at most 120 minutes, at most 110 minutes, at most 100 minutes, at most 90 minutes, at most 80 minutes, at most 70 minutes, at most 60 minutes, at most 50 minutes, and/or at most 40 minutes. Stated differently, the difference between the subsequent heating time and the initial heating time may be bounded by any of the above time differences, as appropriate.

Structural layer 20 may, may be designed to, and/or may be selected to provide structural integrity to composite structure 10. Stated another way, a primary function of structural layer 20, within composite structure 10, may be to provide structural integrity, such as via providing a desired level of rigidity, stiffness, and/or flexibility to composite structure 10.

As illustrated in dashed lines in FIGS. 2-3, structural layer 20 may include a plurality of structural fibers 32, which may be at least partially, or even completely, encapsulated within structural resin 26, within uncured structural resin 28, and/or within cured structural resin 30. Examples of the plurality of structural fibers 32 include a plurality of structural carbon fibers, a plurality of structural fiberglass fibers, and/or a plurality of structural aramid fibers. In some examples, structural layer 20 and/or structural fibers 32 include and/or are arranged in a plurality of layered structural plies of composite material, which may include structural resin 26, uncured structural resin 28, and/or cured structural resin 30.

Structural resin 26 may include and/or be any suitable resin that may have, define, and/or exhibit the structural resin viscosity, the structural resin gel point temperature, and/or the structural resin gel time. Examples of structural resin 26 include a structural epoxy resin, a structural thermoset resin, a structural phenolic resin, and/or a structural polybismaleimide resin.

Surface layer 50 may, may be designed to, and/or may be selected to provide a desired surface property and/or characteristic to composite structure 10. As an example, surface layer 50 may define an ultraviolet light-resistant layer of cured composite structure 14. The ultraviolet light-resistant layer may be configured to resist degradation of cured composite structure 14 when exposed to ultraviolet light and/or to protect structural layer 20 from ultraviolet light. As another example, surface layer 50 may define a sealing layer of cured composite structure 14. The sealing layer may be configured to seal a remainder of cured composite structure 14, such as structural layer 20, from contact with an ambient environment that surrounds cured composite structure 14. As yet another example, surface layer 50 may define an adhesion layer, a primer layer, and/or an in-mold primer layer of cured composite structure 14. The adhesion layer, the primer layer, and/or the in-mold primer layer may be configured to facilitate adhesion of another layer and/or material, such as paint, to cured composite structure 14.

As illustrated in dashed lines in FIGS. 2-3, surface layer 50 may include a plurality of surface fibers 62, which may be at least partially, or even completely, encapsulated within surface resin 56, within uncured surface resin 58, and/or within cured surface resin 60. Examples of the plurality of surface fibers 62 include a plurality of fiberglass surface fibers, a plurality of polyester surface fibers, and/or a plurality of nylon surface fibers. The plurality of surface fibers 62 may be arranged, within surface layer 50, in any suitable manner. As examples, the plurality of surface fibers may be arranged in a surface weave, a surface mat, and/or a surface scrim mat.

Surface resin 56 may include and/or be any suitable resin that may have, define, and/or exhibit the surface resin viscosity, the surface resin gel point temperature, and/or the surface resin gel time. Additionally or alternatively, surface resin 56 may include and/or be any suitable resin that may restrict ultraviolet light from being incident upon structural layer 20, such as via reflection and/or absorption of the ultraviolet light. Additionally or alternatively, surface resin 56 may include and/or be any suitable resin that may seal structural layer 20. Additionally or alternatively, surface resin 56 may include and/or be any suitable resin that may improve adhesion, may function as a primer, and/or may function as an in-mold primer for attachment of another layer and/or material to cured composite structure 14. Examples of surface resin 56, of uncured surface resin 58, and/or of cured surface resin 60 include an ultraviolet light-resistant surface resin, an aliphatic epoxy surface resin, and/or a fire-retardant surface resin.

In some examples, and as illustrated in dashed lines in FIGS. 2-3, surface layer 50 includes an additive 64. Additive 64, when present, may be adapted, configured, formulated, synthesized, and/or selected to modify and/or change at least one property of surface layer 50. An example of additive 64 includes a flow-control additive. The flow-control additive may be selected such that the surface resin viscosity has a desired surface resin viscosity magnitude. An example of the flow-control additive includes, or is, titanium dioxide.

As discussed, the surface resin viscosity is greater than the structural resin viscosity. Such a configuration may decrease a potential for the uncured surface resin to diffuse into and/or mix with the uncured structural resin, such as prior to and/or during the initially heating at 130. Subsequent to the initially heating at 130, and as discussed, the uncured surface resin has gelled, has crosslinked, and/or has been converted to the cured surface resin. The gelled uncured surface resin, the crosslinked uncured surface resin, and/or the cured surface resin then defines a unitary and/or cohesive surface layer, which resists mixing and/or diffusion with the uncured structural resin. Such a configuration permits cured composite structures formed via methods 100, according to the present disclosure, to maintain at least partial separation between the cured surface resin and the cured structural resin within the cured composite structure, thereby permitting the cured surface resin to protect the structural layer from environmental factors, as discussed herein.

The surface resin viscosity may be greater than the structural resin viscosity by any suitable magnitude and/or value. As an example, the surface resin viscosity may be a threshold viscosity multiple of the structural resin viscosity. Stated differently, the structural resin viscosity may be a threshold viscosity fraction of the surface resin viscosity, with the threshold viscosity fraction being defined as an inverse of the threshold viscosity multiple. Examples of the threshold viscosity multiple include multiples of at least 5, at least 7.5, at least 10, at least 20, at least 40, at least 60, at least 80, at least 100, at least 200, at least 400, at least 600, at least 800, at least 1,000, at most 10,000, at most 8,000, at most 6,000, at most 4,000, at most 2,000, at most 1,000, at most 800, at most 600, at most 400, at most 200, and/or at most 100. Stated differently, the threshold viscosity multiple may be bounded by any of the above multiples, as appropriate.

As also discussed, the surface resin gel point temperature is less than the structural resin gel point temperature. As such, and as discussed, the initial temperature, which is attained during the initially heating at 130, is sufficient to gel the uncured surface resin but insufficient to gel the uncured structural resin. Stated another way, by specifying that the surface resin gel point temperature is less than the structural resin gel point temperature, the composite structures and methods, disclosed herein, may gel the uncured surface resin earlier in the curing process when compared to the uncured structural resin. This earlier gelling of the uncured surface resin may permit and/or facilitate the at least partial separation between the cured surface resin and the cured structural resin within the cured composite structure, thereby permitting the cured surface resin to protect the structural layer from environmental factors, as discussed herein.

The surface resin gel point temperature may differ from the structural resin gel point temperature by any suitable amount. As an example, the surface resin gel point temperature may be a threshold gel temperature difference less than the structural resin gel point temperature. Stated differently, the structural resin gel point temperature may be the threshold gel temperature difference greater than the surface resin gel point temperature. Examples of the threshold gel temperature difference include temperature differences of at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at most 120° C., at most 110° C., at most 100° C., at most 90° C., at most 80° C., at most 70° C., at most 60° C., and/or at most 50° C. Stated differently, the threshold gel temperature difference may be bounded by any of the above temperature differences, as appropriate.

As also discussed, the surface resin gel time may be less than the structural resin gel time. As such, and as discussed, the uncured surface resin may gel more quickly relative to the uncured structural resin at a given temperature. Stated differently, the cure kinetics of the uncured surface resin may be relatively faster when compared to the cure kinetics of the uncured structural resin. Stated another way, by specifying that the surface resin gel time is less than the structural resin gel time, the composite structures and methods, disclosed herein, may gel the uncured surface resin earlier in the curing process when compared to the uncured structural resin. This earlier gelling of the uncured surface resin may permit and/or facilitate the at least partial separation between the cured surface resin and the cured structural resin within the cured composite structure, thereby permitting the cured surface resin to protect the structural layer from environmental factors, as discussed herein.

The surface resin gel time may differ from the structural resin gel time by any suitable amount. As an example, the surface resin gel time may be a threshold gel time difference less than the structural resin gel time. Stated differently, the structural resin gel time may be the threshold gel time difference greater than the surface resin gel time. Examples of the threshold gel time difference include time differences of at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at most 120 minutes, at most 110 minutes, at most 100 minutes, at most 90 minutes, at most 80 minutes, at most 70 minutes, at most 60 minutes, at most 50 minutes, and/or at most 40 minutes. Stated differently, the threshold gel time difference may be bounded by any of the above time differences, as appropriate.

Figure 4:
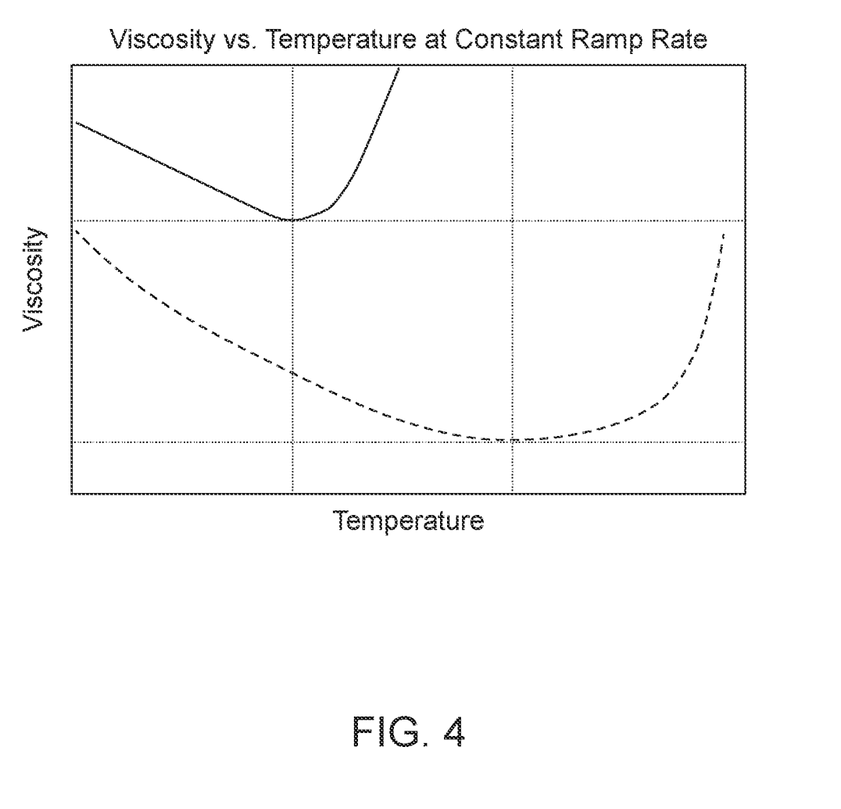
FIG. 4 is a plot illustrating viscosity as a function of cure temperature at a constant ramp rate for two resins that may be utilized with the uncured composite structures, composite structures, and methods, according to the present disclosure.

FIG. 4 is a plot illustrating viscosity as a function of cure temperature at a constant ramp rate for two resins that may be utilized with the uncured composite structures, composite structures, and methods, according to the present disclosure. FIG. 4 graphically illustrates the above-described differences between the surface resin, for which cure kinetics are illustrated in solid lines, and the structural resin, for which cure kinetics are illustrated in dashed lines. As illustrated in FIG. 4, and as the cure temperature is ramped at the constant ramp rate, both the surface resin viscosity and the structural resin viscosity initially will decrease. However, and as also illustrated in FIG. 4, the surface resin and the structural resin are selected such that the surface resin viscosity always remains greater than the structural resin viscosity.

FIG. 4 further illustrates that both the surface resin and the structural resin exhibit a corresponding viscosity minimum, which corresponds generally to the surface resin gel point temperature and the structural resin gel point temperature, respectively. Both the surface resin and the structural resin then exhibit a pronounced increase in viscosity due to gelling, or crosslinking, of the respective resins. As discussed herein, this increase in viscosity occurs at a lower temperature for the surface resin relative to the structural resin.

As discussed, uncured composite structures 12, cured composite structures 14, and methods 100, which are disclosed herein, limit mixing, mingling, and/or diffusion between surface layer 50 and structural layer 20. As also discussed, this limiting of the mixing, mingling, and/or diffusion permits the disclosed uncured composite structures 12, cured composite structures 14, and methods 100 to exhibit improved and/or desired characteristics when compared to conventional composite structures formed via conventional methods. More specifically, uncured composite structures 12, cured composite structures 14, and methods 100, according to the present disclosure, permit surface layer 50 to be more uniform relative to conventional surface layers and/or permit surface layer 50 to better protect structural layer 20 from environmental factors when compared to the conventional surface layers.

Turning to FIG. 3, it is expected that methods 100 and/or cured composite structures 14 formed therefrom may exhibit limited mixing, mingling, and/or diffusion between surface layer 50 and structural layer 20. This limited mixing, mingling, and/or diffusion may be desirable in that it may increase adhesion between surface layer 50 and structural layer 20. However, this mixing, mingling, and/or diffusion between cured surface layer 54 and cured structural layer 24, within cured composite structure 14, may be confined to an interface region 40 between cured surface layer 54 and cured structural layer 24. Stated another way, and as illustrated in FIG. 3, interface region 40 may include both cured surface resin 60 and cured structural resin 30 and/or may be a mixture of cured surface resin 60 and cured structural resin 30. However, interface region 40 may be covered and/or encapsulated by cured surface layer 54, which includes cured surface resin 60 but may not include cured structural resin 30. Stated another way, cured surface layer 54 may define an exposed surface 68, and at least exposed surface 68 may be free of and/or spaced-apart from cured structural resin 30. Additionally or alternatively, cured structural layer 24 may be free of and/or spaced-apart from cured surface resin 60. This is in contrast to conventional cured composite structures formed via conventional methods, within which the conventional structural resin generally extends to the exposed surface of the conventional surface layer, thereby decreasing the ability of the conventional surface layer to protect the conventional structural layer from environmental factors.

In some examples, and as illustrated in FIG. 3, cured surface layer 54 defines a surface layer thickness 66, or an average surface layer thickness 66. Similarly, and in some such examples, interface region 40 defines an interface region thickness 42, or an average interface region thickness 42. In some such examples, a ratio of average surface layer thickness 66 to average interface region thickness 42 may be at least 0.1, at least 0.25, at least 0.5, at least 0.75, at least 1, at least 1.25, at least 1.5, at least 1.75, at least 2, at most 5, at most 4.5, at most 4, at most 3.5, at most 3, at most 2.5, at most 2, at most 1.75, at most 1.5, at most 1.25, at most 1, at most 0.75, and/or at most 0.5. Such a configuration may provide a desired amount, or distance, of separation between exposed surface 68 and cured structural resin 30 contained within interface region 40. Stated differently, the ratio may be bounded by any of the above ratios, as appropriate.

Illustrative, non-exclusive examples of inventive subject matter according to the present disclosure are described in the following enumerated paragraphs:

A1. A method of curing an uncured composite structure that includes a structural layer, which includes an uncured structural resin, and a surface layer, which includes an uncured surface resin, the method comprising:

initially heating the uncured composite structure to an initial temperature, optionally and for an initial heating time, to generate a partially cured composite structure, wherein the uncured surface resin has a surface resin viscosity, a surface resin gel point temperature, and a surface resin gel time, and further wherein the initially heating is sufficient to gel the uncured surface resin but insufficient to gel the uncured structural resin; and subsequently heating the partially cured composite structure to a final cure temperature, which is greater than the initial temperature, optionally and for a subsequent heating time, to generate a cured composite structure, wherein the uncured structural resin has a structural resin viscosity, which is less than the surface resin viscosity, a structural resin gel point temperature, which is greater than the surface resin gel point temperature, and a structural resin gel time, which is greater than the surface resin gel time, and further wherein a combination of the initially heating and the subsequently heating is sufficient to fully cure both the uncured surface resin and the uncured structural resin.

A2. The method of paragraph A1, wherein the initial temperature is at least one of:
  (i) at least 60 degrees Celsius (° C.), at least 65° C., at least 70° C., at least 75° C., at least 80° C., at least 85° C., at least 90° C., at least 95° C., at least 100° C., at least 105° C., or at least 110° C.; and at most 150° C., at most 145° C., at most 140° C., at most 135° C., at most 130° C., at most 125° C., at most 120° C., at most 115° C., at most 110° C., at most 105° C., at most 100° C., at most 95° C., at most 90° C., at most 85° C., or at most 80° C.

A3. The method of any of paragraphs A1-A2, wherein the initial heating time is at least one of:
  (i) at least 2 minutes, at least 4 minutes, at least 6 minutes, at least 8 minutes, at least 10 minutes, at least 12 minutes, at least 14 minutes, at least 16 minutes, at least 18 minutes, or at least 20 minutes; and
  (ii) at most 120 minutes, at most 110 minutes, at most 100 minutes, at most 90 minutes, at most 80 minutes, at most 70 minutes, at most 60 minutes, at most 50 minutes, at most 40 minutes, at most 38 minutes, at most 36 minutes, at most 34 minutes, at most 32 minutes, at most 30 minutes, at most 28 minutes, at most 26 minutes, at most 24 minutes, at most 22 minutes, at most 20 minutes, at most 18 minutes, at most 16 minutes, at most 14 minutes, at most 12 minutes, or at most 10 minutes.

A4 The method of any of paragraphs A1-A3, wherein the initially heating includes at least one of:
  (i) ramping to the initial temperature during the initial heating time; and
  (ii) dwelling at the initial temperature for the initial heating time.

A5. The method of any of paragraphs A1-A4, wherein the final cure temperature is at least one of:
  (i) at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., at least 185° C., at least 190° C., at least 195° C., or at least 200° C.; and
  (iii) at most 250° C., at most 240° C., at most 230° C., at most 220° C., at most 210° C., at most 200° C., at most 195° C., at most 190° C., at most 185° C., at most 180° C., at most 175° C., at most 170° C., at most 165° C., at most 160° C., at most 155° C., at most 150° C., at most 145° C., at most 140° C., at most 135° C., or at most 130° C.

A6. The method of any of paragraphs A1-A5, wherein the subsequent heating time is at least one of:
  (i) at least 15 minutes, at least 20 minutes, at least 25 minutes, at least 30 minutes, at least 35 minutes, at least 40 minutes, at least 45 minutes, at least 50 minutes, at least 55 minutes, or at least 60 minutes; and
  (ii) at most 150 minutes, at most 140 minutes, at most 130 minutes, at most 120 minutes, at most 115 minutes, at most 110 minutes, at most 105 minutes, at most 100 minutes, at most 95 minutes, at most 90 minutes, at most 85 minutes, at most 80 minutes, at most 75 minutes, at most 70 minutes, at most 65 minutes, or at most 60 minutes.

A7. The method of any of paragraphs A1-A6, wherein a difference between the final cure temperature and the initial temperature is at least one of:
  (i) at least 20° C., at least 25° C., at least 30° C., at least 35° C., at least 40° C., at least 45° C., at least 50° C., at least 55° C., at least 60° C., at least 65° C., at least 70° C., at least 75° C., or at least 80° C.; and
  (ii) at most 120° C., at most 110° C., at most 100° C., at most 90° C., at most 80° C., at most 70° C., at most 60° C., or at most 50° C.

A8. The method of any of paragraphs A1-A7, wherein a difference between the subsequent heating time and the initial heating time is at least one of:
  (i) at least 5 minutes, at least 10 minutes, at least 15 minutes, at least 20 minutes, at least 25 minutes, at least 30 minutes, at least 35 minutes, at least 40 minutes, at least 45 minutes, or at least 50 minutes, at least 60 minutes, at least 70 minutes, at least 80 minutes, at least 90 minutes, at least 100 minutes, at least 110 minutes, at least 120 minutes; and
  (ii) at most 150 minutes, at most 140 minutes, at most 130 minutes, at most 120 minutes, at most 110 minutes, at most 100 minutes, at most 90 minutes, at most 80 minutes, at most 70 minutes, at most 60 minutes, at most 50 minutes, or at most 40 minutes.

A9. The method of any of paragraphs A1-A8, wherein the subsequently heating is performed subsequent to the initially heating.

A10. The method of any of paragraphs A1-A9, wherein the subsequent heating time is greater than the initial heating time.

A11. The method of any of paragraphs A1-A10, wherein the subsequently heating includes at least one of:
  (i) ramping to the final cure temperature during the subsequent heating time; and
  (ii) dwelling at the final cure temperature for the subsequent heating time.

A12. The method of any of paragraphs A1-A11, wherein the method further includes providing the uncured composite structure, optionally wherein the providing the uncured composite structure includes providing such that the uncured composite structure includes the structural layer, which includes the uncured structural resin with the structural resin viscosity, the structural resin gel point temperature, and the structural resin gel time, and the surface layer, which includes the uncured surface resin with the surface resin viscosity, the surface resin gel point temperature, and the surface resin gel time.

A13. The method of paragraph A12, wherein the providing the uncured composite structure includes laying up the uncured composite structure.

A14. The method of any of paragraphs A1-A13, wherein the structural layer further includes at least one of:
  (i) a plurality of structural fibers at least partially encapsulated within the uncured structural resin;
  (ii) a plurality of structural carbon fibers at least partially encapsulated within the uncured structural resin;
  (iii) a plurality of structural fiberglass fibers at least partially encapsulated within the uncured structural resin;
  (iv) a plurality of structural aramid fibers at least partially encapsulated within the uncured structural resin; and
  (v) a plurality of layered structural plies of composite material that includes the uncured structural resin.

A15. The method of any of paragraphs A1-A14, wherein the uncured structural resin includes at least one of:
  (i) a structural epoxy resin;
  (ii) a structural thermoset resin;
  (iii) a structural phenolic resin; and
  (iv) a structural polybismaleimide resin.

A16. The method of any of paragraphs A1-A15, wherein the structural layer is configured to provide structural integrity to the cured composite structure.

A17. The method of any of paragraphs A1-A16, wherein the surface layer further includes a plurality of surface fibers at least partially encapsulated within the uncured surface resin.

A18. The method of paragraph A17, wherein the plurality of surface fibers includes at least one of:
(i) a plurality of fiberglass surface fibers;
(ii) a plurality of polyester surface fibers; and
(iii) a plurality of nylon surface fibers.

A19. The method of any of paragraphs A17-A18, wherein the plurality of surface fibers at least one of:
(i) is arranged in a surface weave;
(ii) is arranged in a surface mat; and
(iii) is arranged in a surface scrim mat.

A20. The method of any of paragraphs A1-A19, wherein the uncured surface resin includes at least one of:
(i) an ultraviolet light-resistant surface resin;
(ii) an aliphatic epoxy surface resin; and
(iii) a fire-retardant surface resin.

A21. The method of any of paragraphs A1-A20, wherein the surface layer further includes an additive.

A22. The method of paragraph A21, wherein the additive includes a flow-control additive selected such that the surface resin viscosity has a desired surface resin viscosity magnitude, optionally wherein the flow-control additive includes titanium dioxide.

A23. The method of any of paragraphs A1-A22, wherein the surface layer is configured to at least one of:
(i) define an ultraviolet light-resistant layer of the cured composite structure;
(ii) define a sealing layer of the cured composite structure;
(iii) define an adhesion layer of the cured composite structure;
(iv) define a primer layer of the cured composite structure; and
(v) define an in-mold primer layer of the cured composite structure.

A24. The method of any of paragraphs A1-A23, wherein the surface resin viscosity is a threshold viscosity multiple of the structural resin viscosity, optionally wherein the threshold viscosity multiple is at least one of:
(i) at least 5, at least 7.5, at least 10, at least 20, at least 40, at least 60, at least 80, at least 100, at least 200, at least 400, at least 600, at least 800, or at least 1,000; and
(ii) at most 10,000, at most 8,000, at most 6,000, at most 4,000, at most 2,000, at most 1,000, at most 800, at most 600, at most 400, at most 200, or at most 100.

A25. The method of any of paragraphs A1-A24, wherein the surface resin gel point temperature is a threshold gel temperature difference less than the structural resin gel point temperature, optionally wherein the threshold gel temperature difference is at least one of:
(i) at least 20° C., at least 25° C., at least 30° C., at least 35° C., at least 40° C., at least 45° C., at least 50° C., at least 55° C., at least 60° C., at least 65° C., at least 70° C., at least 75° C., or at least 80° C.; and
(ii) at most 120° C., at most 110° C., at most 100° C., at most 90° C., at most 80° C., at most 70° C., at most 60° C., or at most 50° C.

A26. The method of any of paragraphs A1-A25, wherein the surface resin gel time is a threshold gel time difference less than the structural resin gel time, optionally wherein the threshold gel time difference is at least one of:
(i) at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 60 minutes, at least 70 minutes, at least 80 minutes, at least 90 minutes, at least 100 minutes, at least 110 minutes, or at least 120 minutes; and at most 150 minutes, at most 140 minutes, at most 130 minutes, at most 120 minutes, at most 110 minutes, at most 100 minutes, at most 90 minutes, at most 80 minutes, at most 70 minutes, at most 60 minutes, at most 50 minutes, or at most 40 minutes.

A27. The method of any of paragraphs A1-A26, wherein the method further includes applying a pressure, or an elevated atmospheric pressure, at least one of:
(i) to the uncured composite structure and during the initially heating; and
(ii) to the partially cured composite structure and during the subsequently heating.

A28. The method of paragraph A27, wherein the applying the pressure includes at least one of:
(i) autoclaving the uncured composite structure during the initially heating; and
(ii) autoclaving the partially cured composite structure during the subsequently heating.

A29. The method of any of paragraphs A27-A28, wherein the initially heating includes hardening the surface layer to generate a hardened surface layer, and further wherein, during the subsequently heating and also during the applying the pressure, the method further includes resisting deformation of the hardened surface layer.

B1. An uncured composite structure, comprising:
a structural layer that includes an uncured structural resin, wherein the uncured structural resin includes a structural resin viscosity, a structural resin gel point temperature, and a structural resin gel time; and
a surface layer that includes an uncured surface resin, wherein the uncured surface resin includes a surface resin viscosity that is greater than the structural resin viscosity, a surface resin gel point temperature that is less than the structural resin gel point temperature, and a surface resin gel time that is less than the structural resin gel time.

B2. A cured composite structure formed by curing the uncured composite structure of paragraph B1 according to the method of any of paragraphs A1-A29.

C1. A cured composite structure, comprising:
a cured structural layer that includes a cured structural resin formed from an uncured structural resin, wherein the uncured structural resin includes a structural resin viscosity, a structural resin gel point temperature, and a structural resin gel time;
a cured surface layer that includes an exposed surface defined by a cured surface resin, which is formed from an uncured surface resin, wherein the uncured surface resin includes a surface resin viscosity that is greater than the structural resin viscosity, a surface resin gel point temperature that is less than the structural resin gel point temperature, and a surface resin gel time that is less than the structural resin gel time; and
an interface region between the cured surface layer and the cured structural layer, wherein:
(i) the exposed surface is free of the cured structural resin; and
(ii) the interface region includes a mixture of the cured surface resin and the cured structural resin.

C2. The method of paragraph C1, wherein the cured surface layer defines an average surface layer thickness, wherein the interface region defines an average interface region thickness, and further wherein a ratio of the average surface layer thickness to the average interface region thickness is at least one of:

(i) at least 0.1, at least 0.25, at least 0.5, at least 0.75, at least 1, at least 1.25, at least 1.5, at least 1.75, or at least 2; and (ii) at most 5, at most 4.5, at most 4, at most 3.5, at most 3, at most 2.5, at most 2, at most 1.75, at most 1.5, at most 1.25, at most 1, at most 0.75, or at most 0.5.

C3. The method of any of paragraphs C1-C2, wherein the cured composite structure is formed via the method of any of paragraphs A1-A29.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of curing an uncured composite structure that includes a structural layer, which includes an uncured structural resin with a structural resin viscosity, and a surface layer, which includes an uncured surface resin with a surface resin viscosity that is greater than the structural resin viscosity, the method comprising:
   initially heating the uncured composite structure to an initial temperature to generate a partially cured composite structure, wherein the initially heating is sufficient to gel the uncured surface resin but insufficient to gel the uncured structural resin; and
   subsequently heating the partially cured composite structure to a final cure temperature, which is greater than the initial temperature, to generate a cured composite structure, wherein a combination of the initially heating and the subsequently heating is sufficient to fully cure both the uncured surface resin and the uncured structural resin.

2. The method of claim 1, wherein the initial temperature is at least 90 degrees Celsius (° C.) and at most 140° C.

3. The method of claim 1, wherein the initially heating includes initially heating for an initial heating time of at least 2 minutes and at most 30 minutes.

4. The method of claim 1, wherein the final cure temperature is at least 120° C. and at most 260° C.

5. The method of claim 1, wherein the subsequently heating includes heating for a subsequent heating time of at least 15 minutes and at most 120 minutes.

6. The method of claim 1, wherein a difference between the final cure temperature and the initial temperature is at least 20° C.

7. The method of claim 1, wherein the initially heating includes initially heating for an initial heating time, wherein the subsequently heating includes heating for a subsequent heating time, and further wherein a difference between the subsequent heating time and the initial heating time is at least 10 minutes.

8. The method of claim 1, wherein the structural layer further includes at least one of:
   (i) a plurality of structural fibers at least partially encapsulated within the uncured structural resin;
   (ii) a plurality of structural carbon fibers at least partially encapsulated within the uncured structural resin; and
   (iii) a plurality of layered structural plies of composite material that includes the uncured structural resin.

9. The method of claim 1, wherein the uncured structural resin includes at least one of:
   (i) a structural epoxy resin;
   (ii) a structural thermoset resin;
   (iii) a structural phenolic resin; and
   (iv) a structural polybismaleimide resin.

10. The method of claim 1, wherein the surface layer further includes a plurality of surface fibers at least partially encapsulated within the uncured surface resin.

11. The method of claim 1, wherein the uncured surface resin includes at least one of:
    (i) an ultraviolet light-resistant surface resin;
    (ii) an aliphatic epoxy surface resin; and
    (iii) a fire-retardant surface resin.

12. The method of claim 1, wherein the surface layer is configured to at least one of:
    (i) define an ultraviolet light-resistant layer of the cured composite structure;
    (ii) define a sealing layer of the cured composite structure;
    (iii) define an adhesion layer of the cured composite structure;
    (iv) define a primer layer of the cured composite structure; and
    (v) define an in-mold primer layer of the cured composite structure.

13. The method of claim 1, wherein the surface resin viscosity is a threshold viscosity multiple of the structural resin viscosity, wherein the threshold viscosity multiple is at least 10.

14. The method of claim 1, wherein the uncured surface resin has a surface resin gel point temperature, wherein the uncured structural resin has a structural resin gel point temperature, wherein the surface resin gel point temperature is a threshold gel temperature difference less than the structural resin gel point temperature, wherein the threshold gel temperature difference is at least 40° C, wherein the uncured surface resin has a surface resin gel time at the surface resin gel point temperature, wherein the uncured structural resin has a structural resin gel time at the structural resin gel point temperature, wherein the surface resin gel time is a threshold gel time difference less than the structural resin gel time, and further wherein the threshold gel time difference is at least 5 minutes.

15. The method of claim 1, wherein the method further includes applying a pressure at least one of:
    (i) to the uncured composite structure and during the initially heating; and
    (ii) to the partially cured composite structure and during the subsequently heating.

16. The method of claim 15, wherein the initially heating includes hardening the surface layer to generate a hardened surface layer, and further wherein, during the subsequently heating and also during the applying the pressure, the method further includes resisting deformation of the hardened surface layer.

* * * * *